United States Patent

[11] 3,557,718

| [72] | Inventor | Thomas E. Chivers<br>Osseo, Minn. |
|---|---|---|
| [21] | Appl. No. | 730,075 |
| [22] | Filed | May 17, 1968 |
| [45] | Patented | Jan. 26, 1971 |
| [73] | Assignee | General Mills, Inc.<br>a corporation of Delaware |

[54] PROCESS FOR COATING CEREAL WITH CANDY FLOSS
17 Claims, 4 Drawing Figs.

[52] U.S. Cl. .................................................. 107/54, 107/8
[51] Int. Cl. .................................................. A21d 15/00
[50] Field of Search ....................................... 107/8.7, 54.6; 118/19; 99/83, 66; 117/100

[56] References Cited
UNITED STATES PATENTS

| 1,012,877 | 12/1911 | Mahan | 118/19 |
| 3,029,751 | 4/1962 | Gilmore | 107/54(.6)X |
| 3,184,316 | 5/1965 | Doan et al. | 107/54(.6)X |
| 3,221,675 | 12/1965 | Forkner | 107/8(.7)X |
| 3,366,484 | 1/1968 | Weiss | 99/83 |

*Primary Examiner*—Laverne D. Geiger
*Assistant Examiner*—Robert I. Smith
*Attorneys*—Anthony A. Juettner, William C. Babcock and L. Me Roy Lillehaugen

ABSTRACT: A process for making a sweetened, ready-to-eat food product. Particles of ground candy floss are applied to the moistened surfaces of cereal pieces, after which the cereal pieces are heated to reduce their moisture content and to cause the coating to form a glaze surrounding the pieces.

PATENTED JAN 26 1971
3,557,718
SHEET 1 OF 2
FIG. 1
FIG. 2
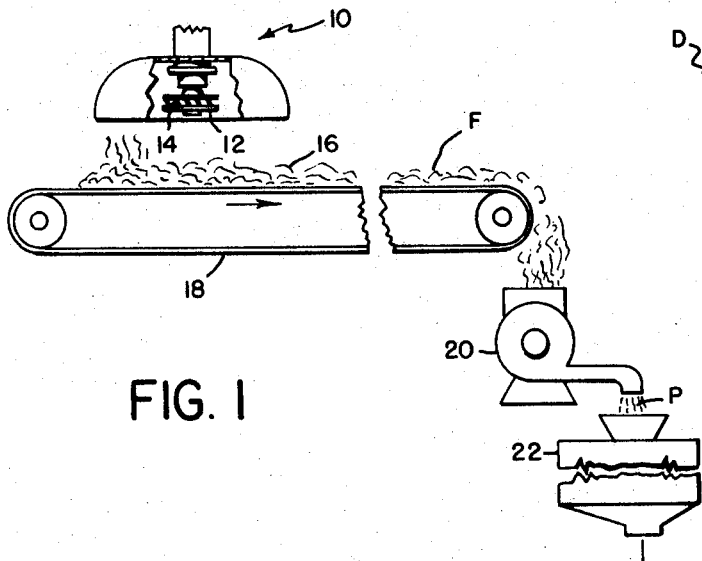
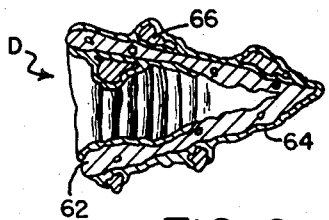
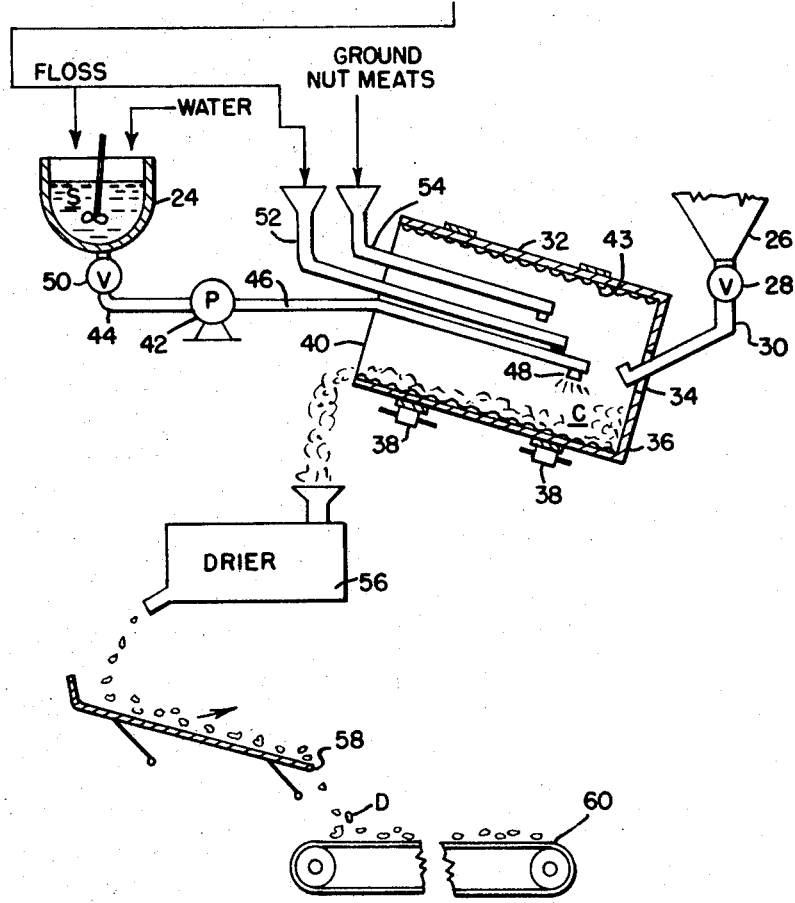
INVENTOR.
THOMAS E. CHIVERS
BY
ATTORNEY

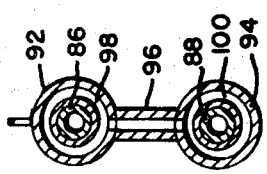
FIG. 4
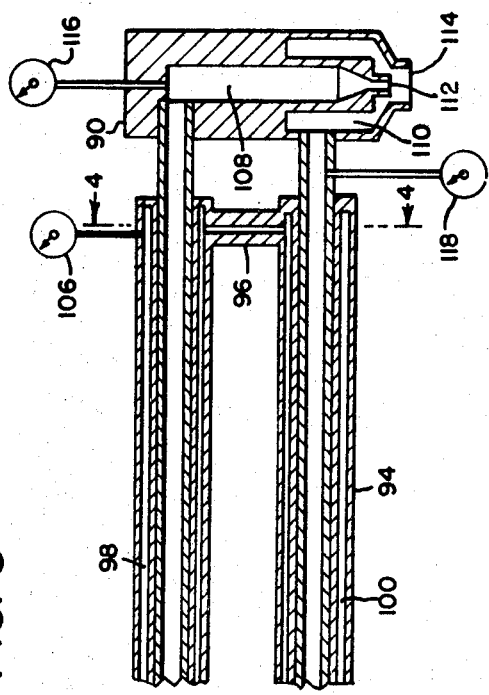
FIG. 3
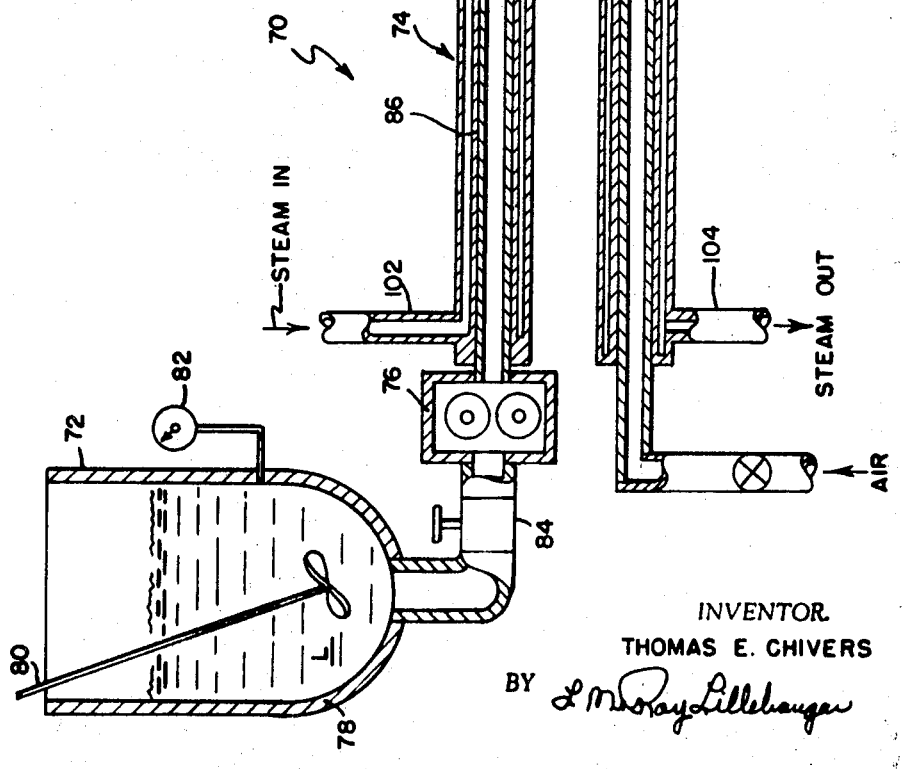
INVENTOR
THOMAS E. CHIVERS
BY *L. McCoy Lillehaugen*
ATTORNEY

PROCESS FOR COATING CEREAL WITH CANDY FLOSS

The present invention relates to the coating of food products with a sweetened composition, and more specifically to a process for coating ready-to-eat food products with a sweetened glossy coating formed of sugar in a noncrystalline state.

Sweetened food products, such as ready-to-eat breakfast cereals, or confection-type snack products such as popcorn, are well known in the art. Food products of this type are generally coated with a candy coating comprised primarily of sucrose, by applying a sugar syrup or a molten candy to the product. In many instances the product is coated by mixing and agitating the pieces to be coated, with a quantity of the syrup or candy composition; this can be accomplished by stirring the mixture in a kettle or other vessel, or by tumbling the mixture in an enrober or related device, so that the syrup is distributed around the product.

According to the known prior art, ready-to-eat cereal products are sometimes coated in such a manner that they have a somewhat whitish, opaque, crystalline coating. This can be accomplished for example, by cooking a syrup, containing crystalline sugar, under such temperature and moisture conditions that the sugar remains in a crystalline state when the syrup is applied and the product cooled. The resulting product usually has a somewhat frosted appearance. In other instances, it is preferred that the coated product have a hard, transparent or glasslike coating. While a number of techniques might be employed for doing this, one technique involves cooking a crystalline sugar containing syrup, at a sufficiently high temperature so that most of the moisture is removed (all but 2—5 percent for example) and the crystalline sugar is converted to an amorphous, noncrystalline state. When such a product is applied to a base product and allowed to cool, the resulting product has a hard, clear coating surrounding it, and the sugar remains in an amorphous state.

It has been found that the known procedures for applying a transparent coating, such as mixing the product with a heated syrup, work quite well for coating food products which are somewhat uniformly shaped, and/or which have sufficient body structure and rigidity so as to not disintegrate or crumble during the coating operation. Certain food products, such as flakes for example, cannot withstand the tumbling and rolling action which results when the products are mixed and agitated with a relatively thick, sticky syrup composition. As a result, such products often crumble into numerous pieces, which detracts from the acceptability and marketability of the product.

Accordingly, one object of the present invention is to provide a novel process for coating food products with a sweetened composition.

Another object is to provide an improved process for making a sweetened ready-to-eat food product having a transparent or glossy coating.

A further object is to provide a process for coating irregularly shaped food products with a sweetened composition, wherein the food products are substantially uniformly covered.

Another object is to provide a process for coating somewhat fragile food pieces with a sweetened composition with a minimum amount of damage to the pieces.

A still further object is to provide a process for making a ready-to-eat food product, which is coated with a sweetened composition in which crystalline sugar is converted to an amorphous or noncrystalline state.

Other objects and advantages will become apparent from a consideration of the following detailed description of the invention. Before proceeding with a detailed description of the invention however, a brief description of it will be presented.

Briefly, the invention involves making a pulverulent material by forming filaments of candy floss from crystalline sugar, and grinding the filaments into small particles. A slurry, comprised of about 2—3 parts of the floss particles and about 1 part water at room temperature, is sprayed onto a tumbling mass of food pieces so that the surfaces of the food pieces are coated with the sticky or tacky slurry. Additional particles of the ground floss, as well as other ingredients such as ground nutmeats, are also sprinkled onto the moistened tumbling mass of food pieces. The coated pieces are then dried in an appropriate oven or drier at an elevated temperature, so that the moisture content of the pieces is reduced, the slurry forms a hard glaze around the pieces, and the particles of ground floss and nutmeats are caused to fuse and adhere to the surfaces of the food pieces. The dried food pieces are then vibrated briefly to break up agglomerates and separate the pieces from each other, and then cooled to a desired temperature, after which they are ready for storage or packaging.

The invention will be better understood by reference to the following drawings wherein:

FIG. 1 is an overall schematic view illustrating a process for coating food pieces;

FIG. 2 illustrates a cereal piece coated with a sweetened composition;

FIG. 3 depicts another form of apparatus for forming candy floss; and

FIG. 4 is an enlarged sectional view taken along the line 4—4 of FIG. 3.

The first step of the present invention concerns converting crystalline sugar into a noncrystalline or amorphous state. Cotton candy or sugar floss in the form of fine fluffy filaments of sugar, is customarily made from ordinary cane sugar. One well known procedure for forming cotton candy involves placing sugar particles in a rotative vessel, heating the vessel so as to reduce the sugar to a molten state, and spinning the vessel so that the sugar is ejected by centrifugal force in threadlike filaments through appropriate openings in the vessel wall. The cotton candy thus formed is comprised of sugar in a noncrystalline or amorphous state, and for optimum results it should contain little or no moisture, e.g. 1 percent or less. If too much moisture is present, the floss has a tendency to fuse into a hard mass of candy.

The present invention can be readily practiced on a batch basis, or if desired, a continuous operation might be employed. For purposes of illustration, FIG. 1 depicts the invention by utilizing a continuous operation. In FIG. 1, a typical cotton candy forming apparatus 10 is partially shown. Briefly, the apparatus includes a heated, rotatable vessel 12 having openings 14. As known, the sugar crystals are introduced into the vessel 12, are heated to a molten state in the vessel, and are centrifugally forced through the openings 14, in the form of candy floss. It should be pointed out of course that if desired, the candy floss might be formed by using other techniques and equipment as well; FIGS. 3 and 4 for example, which are described below, illustrate an apparatus for forming a flavored candy floss.

The candy floss, designated by letter F, is collected on a conveyor 18 and transferred into an appropriate grinding machine 20, at which point the cotton candy is ground into particles having a prescribed particle size. Various types of well known and commercially available grinding mills might be used with satisfactory results. Mechanical impact mills having hammers and/or whizzers therein which impact against the particles and aid in moving them through the grinding chamber are commonly known and used for grinding purposes. As known, material introduced into the grinding chamber of such mills is reduced in size by attrition with the hammers and walls of the grinding chamber. Mills which might be used include Fitzpatrick Mills, Raymond Vertical Mills, and Schutz-O'Neill Mills.

After grinding, the floss particles, designated by letter P, are stored in a container 22 for future use. Since cotton candy is quite hygroscopic, the ground floss should preferably be stored under relatively low humidity and temperature conditions.

A syrup or slurry designated by letter S, is formed by combining particles of the candy floss with water, and any desired flavoring ingredients, and mixing the ingredients together in a kettle 24. Generally, the ratio of floss to water should be about three parts of floss to one part of water; more preferably, the ratio should be about 2 parts of floss to 1 part of water. As known, the saturation point of sugar and water at room temperature is about 2:1. If too much floss is used, it tends to crystallize out and settle to the bottom of the kettle. If on the other hand, too much water is used in the mixture, the resulting slurry might become too thin, and there might be a tendency to soak the cereal pieces to an objectionable extent when the slurry is applied to the pieces, unless precautions are taken; pieces which are oversoaked become difficult to dry. At this point, it might be pointed out, that in some instances it might be preferred to moisten the pieces with only water, and rather apply a sufficient amount of the floss in powder form as a subsequent step; the floss thus applied absorbs a part of the available moisture. The surface moisture content of the moistened pieces should range from about 10—20 percent, and more preferably from about 10 to 13 percent. If preferred, the kettle 24 can be heated slightly, e.g. to 200° F., so that the temperature of the contents is raised. By heating the syrup slightly, an additional amount of candy floss can be absorbed by the moisture present in the kettle.

The slurry might also be formed by using crystalline white sugar, brown sugar, or a combination of the two if desired, in lieu of the candy floss. The use of the floss however, provides a convenient way for making the slurry, because as described below, the ground floss is subsequently used in larger amounts for coating the cereal pieces. It might be pointed out that flavoring ingredients such as molasses, concentrated flavorants, and the like, might also be used if desired.

Cereal pieces designated by letter C are fed from a storage bin 26 through a control valve 28 and conduit 30, into an enrober 32 having an opening 34 in a first end 36. The enrober 32 is caused to rotate about its longitudinal axis by rollers 38, which are driven by appropriate means (not shown), and it is inclined so that its longitudinal axis defines an angle with respect to a horizontal plane. The opposite end 40 of the enrober is uncovered. The inner surface 43 of the enrober is somewhat roughened to aid in mixing and moving material deposited into it.

The slurry S is removed from the kettle 24 and transferred to the enrober 32 by means of a pump 42, conduits 44 and 46, and nozzle 48. A valve 50 is provided for controlling the flow of the slurry from the kettle. The pump 42 might be any conventional sanitary pump suitable for use with foods. The slurry S is preferably introduced onto the cereal pieces C as an atomized spray. Spray nozzles having the desired spray producing characteristics are commercially available, and will not be described in detail. Illustrative of the types which might satisfactorily be used are nozzles manufactured by Spraying Systems Co., of Bellwood, Illinois. Such nozzles are shown for example in Catalog 25 entitled "Industrial Spray Nozzles and Accessories," Copyright 1963.

As illustrated in FIG. 1, a conduit 52 is provided for introducing additional particles of the candy floss into the enrober 32. Since the noncrystalline floss in the slurry reverts to a crystalline state when the water is removed, e.g. by subsequent drying, it is necessary to add additional particles of the floss to the surfaces of the cereal pieces after they have been moistened, if a noncrystalline coating is to be obtained. Since the particles of candy floss are very hygroscopic, they immediately fuse onto the surfaces of the moistened cereal pieces when they come in contact with the tumbling mass in the enrober. The addition of the powdered floss aids in preventing the cereal pieces from absorbing too much moisture, because the floss particles immediately absorb some of the moisture present. Furthermore, if desired, particles of other food materials might also be introduced into the enrober, e.g. by sprinkling through an opening in conduit 54. Typical of such food products are ground nutmeats such as peanuts, coconut, and the like. Moreover, if preferred, nutmeats such as peanuts, might be ground with the candy floss in the impact mill, and the resulting powder dusted onto the moistened cereal pieces.

As the moistened and coated cereal pieces are tumbled in the inclined enrober 32, they are caused to advance toward the open end of the enrober, at which point they are introduced into a drier 56 where their moisture content is reduced to a level of about 0.5—3 percent. The temperature in the drier can vary within quite a wide range; preferably, it should not be too hot because the coating on the pieces might tend to blister to an objectionable extent. An air temperature of about 170°—350° F. has been found to work with good results; preferably, the temperature should be at the lower end of this range. By applying heat during the drying step, the slurry forms a hard glaze which surrounds the cereal pieces.

After drying, the cereal pieces are deposited on a vibratory platform 58 so that any agglomerates are broken up and the pieces are separated from each other. The pieces are then deposited on a conveyor belt 60, permitted to cool, and stored or immediately packaged. The amount of the sweetened composition should comprise about 35—65 percent of the final product, and more preferably, about 45—50 percent. If ground nutmeats of some type are included in the final product, the ratio of each can vary, depending upon the specific flavor and texture desired. The final product might be comprised of about 40—60 percent of the cereal food base, 40—60 percent of the sweetened composition, and about 10—20 percent ground nutmeats.

The present invention can be carried out by using a variety of cereal grains, such as rice, wheat, oats, corn, barley, or any combination of two or more of the grains, as the base for forming cereal pieces having a variety of shapes and sizes. As known, various techniques have been developed for forming the cereal grain into a dry cereal piece having a prescribed shape, texture, and size. Cereal products having a puffed, flaked or shredded form for example, are well known in the art. Furthermore, it has become well known to form cereal grains into pieces having unique and different configurations as well, such as doughnut shapes, cone shapes, heart shapes, and the like.

FIG. 2 illustrates a sweetened product D formed in accordance with the teachings of the present invention. The product includes a cone-shaped cereal piece 62 substantially coated with a sweetened glaze-type covering 64. Ground peanuts 66 are fused or adhered to the surfaces of the cereal piece by means of the sweetened covering 64.

FIGS. 3 and 4 illustrate another type of apparatus for practicing the present invention by making a flavored candy floss from a molten liquid slurry or syrup which includes at least sugar and water. The apparatus is designated generally by numeral 70 and it includes a steam jacketed receptacle or makeup kettle 72, a heat exchange unit or cooker 74, and a feed pump 76 interposed between the kettle 72 and the cooker 74, and operatively connected thereto by suitable conduits. The kettle is provided with a steam jacket 78 so that steam might be introduced to heat the contents in the kettle to a prescribed temperature, and thus form a molten slurry or syrup designated by letter L. A heater or agitator 80 is provided for stirring or mixing the ingredients within the kettle. A temperature gauge 82 indicates the temperature of the ingredients within the kettle. It should be recognized of course, that other means might be utilized for heating the kettle; a steam jacket provides a convenient way for raising the temperature of the slurry to a desired level.

The pump 76 is provided for transferring the molten slurry from the kettle 72 to the cooker 74 through the connecting conduits. Preferably the pump 76, as well as the conduits, are steam jacketed or otherwise heated to minimize heat loss of the slurry as it is being transferred. A valve 84 is provided for controlling the flow of the slurry from the kettle. The pump 76 might be any conventional sanitary pump suitable for use with foods; its capacity should be such as to provide a flow equivalent to the throughput rate of the system at the desired output pressure.

The cooker 74 provides a chamber for cooking the molten slurry and for raising its temperature to such a magnitude that most of the moisture in the slurry is flashed off or vaporized when the slurry is discharged from the cooker. Generally, the cooker 74 includes a first elongate cooking chamber or conduit 86 for containing the molten slurry, a second elongate conduit 88 for containing a pressurized gaseous medium such as air, and an atomizing nozzle 90 operatively connected to each of the conduits for discharging the slurry and the pressurized air. Steam jackets 92 and 94 surround the conduits 86 and 88 respectively, and they are connected together by a conduit 96 which provides a passage between them. The steam jacket 92 has an annular passage 98 for containing steam, and the steam jacket 94 has an annular passage 100 for likewise containing steam. Steam is introduced into the jacket 92 at inlet 102, and discharged from the jacket 94 through outlet 104. A pressure gauge 106 is provided for indicating the pressure of the steam within the jackets. As depicted, the conduit 86 is connected to the discharge opening of the pump 76, and the steam jacket 92 covers substantially the entire length of the conduit 86 so as to minimize heat loss, and to adequately heat the entire chamber. The length of the conduits 86 and 88 can vary, depending upon the desired cook time, the pressure exerted by the pump, the heat and pressure of the steam, and the like.

The nozzle 90 is provided for discharging the molten candy from the conduit 86 under pressure, and for atomizing or diffusing the molten candy by subjecting it to a stream of pressurized air. Various nozzles of this type are commercially available, and will not be described in detail. Illustrative of the types which might satisfactorily be used are nozzles manufactured by Spraying Systems Co., of Bellwood, Ill.; such nozzles are shown for example in Catalog 25 referred to above. Briefly, the nozzle includes a first passage 108 which communicates with the conduit 86, and a second annular passage 110 which communicates with the conduit 88. As the molten product is discharged through the passage 108 and opening 112, it is diffused by the air discharged through the passage 110 and opening 114. The rate of air flow is not overly critical; it has been found that too little air causes liquid droplets which become sticky. As the air increases, the droplets disappear.

A temperature gauge 116 is provided for indicating the temperature of the product as it enters the nozzle 90, and a temperature gauge 118 indicates the temperature of the gaseous medium in the conduit 88.

Before describing the operation of the apparatus in detail, the ingredients out of which the slurry L is formed will be briefly described. Since the candy floss is formed from a liquid slurry rather than from dry sugar crystals, it is possible to produce floss having a variety of flavors and colors. This is particularly advantageous when the food pieces to be coated are to have a unique flavor and/or color. Grinding of the floss thus formed, and applying it onto the surface of such pieces results in flavorful and colorful pieces. For this reason, it might be desirable to make the slurry out of a number of ingredients, so as to provide the unique and different flavors and colors desired. The slurry might be formed by combining only sugar and water, e.g. 85—90 percent sucrose and about 10—15 percent water, or by including one or more flavoring and/or coloring ingredients such as brown sugar, corn syrup, molasses, butter, salt, bicarbonate of soda, or the like. Generally, granulated sucrose has been used with good results; although other sugars, such as dextrose, might be used as well. Most commercially available light or dark brown sugars can be used; and most commercially available corn syrups can be used, although a high maltose syrup is preferred. The amounts of each ingredients ingredient can vary, depending upon the exact flavor or color desired. For example, it might be desirable to combine white granulated sugar and brown sugar in equal amounts, with corn syrup, water, and other ingredients; or if preferred, only one of the sugars might be used in the formulation. In most instances, the water should preferably comprise about 10—15 percent of the slurry. If too much water is provided, it becomes more difficult to reduce the moisture of the molten candy to the desired level, e.g. 1.5 percent or less.

If only crystalline sugar and water are used to form the slurry, the resulting candy floss is comprised primarily of sugar in a noncrystalline or amorphous state, since most of the moisture is removed during the formation of the floss. If the slurry formulation includes other ingredients such as corn syrup, the actual amount of such other ingredients contained in the final product might vary, depending upon the amount of moisture contained in the ingredient originally. Syrup for example, contains a certain amount of solids, and a certain amount of moisture, e.g. 20 percent; substantially all of this moisture is ultimately removed.

In operation, the ingredients out of which the candy floss is formed, such as sugar and water, are mixed together in the jacketed kettle 72 to form the slurry L. Steam is introduced into the jacket 78 so that the kettle is heated, and the slurry formed into molten candy by raising the temperature of the slurry at atmospheric pressure, to about 190°—220° F., and more preferably to about 200°—210° F. When heated to this temperature, the sugar dissolves in the water to form a relatively thick slurry, and part of the moisture contained therein evaporates. After the desired temperature of the slurry is reached, it is maintained at that level in the kettle during the floss forming operation. Steam is introduced into the jacket 92 at inlet 102, and it has a temperature of sufficient magnitude to heat the contents of the conduit 86 to a temperature of at least 325° F., and preferably higher. The steam exits through outlet 104. Air is introduced into the conduit 88 and it is likewise heated to an elevated temperature by the hot steam in the jacket 94. By opening the valve 84, the heated slurry is removed from the kettle 72 by means of the pump 76 into the cooker 70, and more specifically the jacketed chamber 86, at a desired feed rate.

As the heated slurry is pumped through the heated chamber 86 it is cooked and formed into a molten candy. As it is discharged from the atomizing nozzle 90 under pressure, it is diffused by the heated pressurized air flowing through the conduit 88, and formed into fine filaments of candy floss. It might be pointed out that if desired, the pressurized air need not be heated; it has been found however, that when cool air is used, there is a tendency for the candy floss to collect on the nozzle 90. The filaments of candy floss are collected on a conveyor or other appropriate collection apparatus, similar to that shown at 18 in FIG. 1.

As the hot molten candy is forced through the nozzle 90, most of the moisture flashes off or vaporizes as it leaves the nozzle and is exposed to the atmosphere. The amount of moisture retained in the candy depends on the ultimate temperature of the molten candy; by raising the temperature of the candy to higher levels, greater amounts of moisture can be flashed off. By heating the candy to a temperature of 340° F. for example, the moisture content can be reduced to less than 1 percent, whereas by raising the temperature to only 300° F., at least 3 percent moisture is retained in the candy floss, which is too high to retain the filaments in floss form under normal operating conditions. If the cooking temperature is only raised to about 280° F., about 5 percent moisture is retained in the floss; under most conditions, such floss will fuse into a hard candy mass almost immediately.

The invention will be better understood by reference to the following examples:

EXAMPLE I

Filaments of candy floss were formed by subjecting 1,000 grams of crystalline sugar to a spinning operation by which the sugar crystals were heated to a molten state in a rotatable vessel and spun into filaments of cotton candy. The candy floss thus formed was in a noncrystalline or amorphous state. The candy floss was then admitted into a Fitz Mill using a 3B screen, and ground into a powder.

A syrup was then formed by combining and mixing about 50 grams of the ground candy floss with 25 cc. of water, at room temperature. This syrup was sprayed onto about 250 grams of cereal pieces placed in a mixing container, such as a rotating enrober. A sprayer was used for producing a fine atomized mist which was directed against the surfaces of the cereal pieces. An additional 200 grams of ground floss were then sprinkled onto the tumbling, moistened cereal pieces in the enrober. The additional floss particles immediately fused to the surfaces of the cereal pieces, and in doing so, absorbed a portion of the moisture contained on the cereal pieces. The mixing was continued until substantially all of the cereal pieces were moistened and coated with the pieces of floss. The moisture content of the coated pieces was then reduced to about 2 percent or less, by oven drying the pieces at about 175° F. for about 60 minutes. The pieces were then vibrated slightly to separate the individual pieces from each other, and then permitted to cool at room temperature. The resulting product was coated quite uniformly with a glazelike covering; a covering which comprised approximately 45—50 percent of the final product.

EXAMPLE II

A flavored syrup was formed by combining and mixing 7 lbs. of brown sugar, 0.2 pounds of molasses, and 0.1 pounds of salt with 3.5 pounds of water. Sixty grams of the resulting syrup were sprayed onto about 250 grams of cereal pieces tumbling in a rotating enrober. Two hundred grams of the ground candy floss formed in Example I, were then sprinkled onto the moistened pieces in the enrober. After tumbling so that the cereal pieces were coated with the floss particles, the pieces were dried at a temperature of about 350° F. so that their moisture content was reduced to about 2 percent, vibrated slightly, and then cooled. A flavored product having a glazed coating surrounding it resulted, which was quite flavorful.

EXAMPLE III

A flavored candy floss was formed from a slurry formed by combining and mixing 12 pounds of brown sugar with 2 pounds of corn syrup, 2 pounds of water, 0.4 pounds of molasses, 0.2 pounds of salt, and 0.1 pounds of bicarbonate of soda. These ingredients were then heated and cooked at atmospheric pressure to a temperature of about 200°—205° F. in a steam jacketed makeup kettle. The heated slurry was then pumped into a first conduit or cooking chamber, at a feed rate of about 18—20 lbs. per hour and a pressure of at least 10 p.s.i. The cooker was heated by introducing steam having a pressure of about 180 p.s.i. into the jacket. The heated slurry was formed into a molten candy in the cooker by raising its temperature to about 340° F. As the molten candy flowed through the cooking chamber, it was discharged through a discharge opening or atomizing nozzle in the second end of the cooker, at which point most of the moisture in the molten candy flashed off so that its moisture content was reduced to less than 1 percent. Air was supplied to a second conduit in the cooker at a feed rate of about 2 s.c.f.m., and it was likewise heated to an elevated temperature of about 360°—380° F., by the hot steam. The heated air was discharged through the atomizing nozzle in such a manner that it was directed against the molten candy being discharged. The pressurized air diffused or atomized the droplets of molten candy and formed it into fine filaments of candy floss. The operation was conducted in a room having a relative humidity of about 30 percent, and a temperature of about 70° F. The flavored candy floss thus formed contained about 82—85 percent brown sugar, about 10 10—12 percent corn syrup solids, about 1.5-—2.5 percent molasses solids, about 1.0—1.5 percent salt, about 0.5—1.0 percent soda, and less than 1 percent moisture.

The floss was ground into a powder by milling it in a Fitz Mill using a 3B screen. A slurry was then prepared by mixing 60 grams of the ground floss with 30 cc. of water. The slurry was sprayed as a fine mist onto about 250 grams of cone-shaped cereal pieces tumbling in a rotating enrober, over a period of about 90 seconds. About 220 grams of additional floss were sprinkled onto the tumbling mass and the mixing continued until all of the pieces were coated with the ground floss which fused onto the surfaces of the pieces. The coated pieces were then dried to a moisture content of 1.5—2.0 percent at a temperature of about 180° F. for about 60 minutes, during which time the floss formed a glaze surrounding the cereal pieces. After drying, the product was vibrated slightly, cooled, and packaged. The resulting product had a sweetened coating of about 50 percent, it had a brownish color, an excellent crunchy texture, an appetizing appearance, and a caramellike flavor which was very tasty.

EXAMPLE IV

A syrup was prepared similar to that of Example III by combining and mixing 6 pounds of brown sugar and 6 pounds of granulated sucrose with 3 pounds of corn syrup, 2 pounds of water, 0.2 pounds of salt, and 0.1 pounds of soda. These ingredients were blended together and heated to a temperature of about 200° F., after which they were cooked at a temperature of about 340° F. and formed into a molten candy, in substantially the same general manner described in Example III. Moisture contained in the molten candy flashed off when the candy was discharged from the cooker nozzle so that less than 1.0 percent moisture was retained in the candy floss. By diffusing the molten candy with heated, pressurized air, filaments of candy floss were formed having a slightly different flavor and color, when compared to that formed in Example III.

The floss thus formed was made into a slurry and applied to a tumbling mass of cereal pieces, in the same manner set forth in Example III, so that the cereal pieces were covered with a glazed, flavored, sweetened composition.

EXAMPLE V 50 grams of the ground candy floss formed in Example III were mixed with 25 cc. of water to form a slurry which was sprayed onto a tumbling mass of about 250 grams of cereal pieces. An additional 220 grams of the powdered floss were sprinkled onto the tumbling cereal pieces, and about 90 grams of chopped peanuts were likewise sprinkled over the cereal pieces. As the floss particles fused to the moistened, sticky surfaces of the cereal pieces, the peanut chips likewise were caused to adhere to the sticky surfaces. When dried and cooled, a delicious confection-type product resulted; the cereal base comprised about 42—43 percent of the product, the sweetened composition of about 42—43 percent, and the peanut chips about 15 percent.

EXAMPLE VI

Flavored candy floss was formed by using the procedure described in Example III. 400 grams of the flavored floss and 200 grams of peanuts were ground in a Fitz Mill using a 2A screen. A slurry, comprised of about 60 grams of the resulting powder and 25 grams of water, was then sprayed onto a tumbling mass of 250 grams of cereal pieces. An additional 220 grams of the ground mixture was sprinkled over the moistened pieces. The resulting product when dried and cooled, was considered very good.

In the above description and attached drawings, a disclosure of the principles of this invention is presented, together with some of the specific examples by which the invention might be carried out.

I claim:

1. A process for coating ready-to-eat food pieces with a sugar-containing sweetened composition, at least a portion of said sugar being in a noncrystalline state, which comprises moistening a tumbling mass of food pieces with a solution containing at least water so that the moisture content of said pieces does not exceed 20 percent, applying particles of ground candy floss to the moistened food pieces, mixing said pieces and said particles together and fusing the particles of candy floss to the moistened surfaces, and heating the coated food pieces thereby reducing their moisture content and causing the coating to form a glaze surrounding the individual pieces.

2. The process of claim 1 which includes moistening the tumbling food pieces with a slurry containing water and particles of candy floss.

3. The process of claim 2 wherein the ratio of floss particles of to water ranges from 0—3 parts of candy floss to 1 part of water.

4. The process of claim 2 wherein the particles of candy floss in the slurry are flavored with ingredients other than crystalline sugar.

5. The process of claim 1 wherein the particles of candy floss which are applied to the moistened food pieces are flavored with ingredients other than crystalline sugar.

6. The process of claim 5 which includes forming filaments of candy floss from a syrup containing at least brown sugar, syrup and water, and grinding said filaments to form particles of candy floss.

7. The process of claim 1 which includes applying particles of ground nutmeats to the surfaces of the moistened mass of food pieces.

8. The process of claim 1 which includes moistening the cereal pieces so their moisture content ranges from about 10-—13 percent, and drying said pieces to a moisture content of less than 3 percent.

9. The process of claim 1 which includes breaking up agglomerates of food pieces and separating said pieces from each other after they have been dried.

10. The process of claim 9 which includes cooling the food pieces after they have been dried and separated from each other.

11. The process of claim 1 which includes forming the particles of candy floss by melting sugar crystals and spinning threadlike filaments from a heated centrifugal head, and grinding said filaments into particles of candy floss.

12. The process of claim 1 which includes forming filaments of flavored candy floss, and grinding said filaments of floss with nutmeats thereby forming a ground mixture of floss particles and nut particles.

13. A process for coating ready-to-eat cereal food pieces with a sweetened composition which comprises forming crystalline sugar into filaments of candy floss, pulverizing said floss into particles having a prescribed size, making a flavored slurry by combining and mixing about 2 parts of said floss particles with about 1 part water at room temperature, spraying said slurry onto a tumbling mass of food pieces and increasing the moisture content of said pieces to about 10—13 percent, applying particles of flavored ground floss onto the moistened tumbling mass, mixing said cereal pieces and said floss particles together thereby fusing said particles to the cereal pieces, said particles absorbing part of the moisture in the cereal pieces, heating the moistened coated pieces thereby reducing their moisture level to less than 3 percent and causing the floss particles to form a glaze surrounding the individual cereal pieces, agitating the dried particles thereby separating them from each other, and cooling the coated pieces.

14. The process of claim 13 which includes grinding nuts into particles, and applying them onto the moistened, tumbling food pieces, said ground nuts being caused to adhere to the surfaces of the cereal pieces.

15. The process of claim 14 wherein the final product is comprised of about 40—60 percent of the cereal piece, about 40—60 percent of the sweetened composition, and about 10-—20 percent of the ground nutmeats.

16. The process of claim 13 which includes forming a flavored candy floss by forming a slurry containing sugar, water and at least one other flavoring ingredient, cooking said slurry and reducing its moisture content to less than 1.5 percent, discharging the slurry from the cooker, forming the slurry into filaments of candy floss by diffusing the slurry with a pressurized gaseous medium as the slurry is discharged from the cooker, and heating the moistened coated pieces at a temperature of at least 170° F. for about 60 minutes.

17. A process for coating ready-to-eat food pieces which comprises forming a slurry by combining water, particles of ground candy floss, and at least one other flavoring ingredient, moistening a tumbling mass of food pieces by spraying said slurry onto said tumbling food pieces so that the moisture content of said pieces does not exceed 20 percent, applying particles of ground candy floss to the moistened food pieces, mixing said pieces and said particles together and fusing the particles of candy floss to the moistened surfaces, and heating the coated food pieces thereby reducing their moisture content and causing the coating to form a glaze surrounding the individual pieces.